No. 839,940. PATENTED JAN. 1, 1907.
L. P. LOWE.
APPARATUS FOR RECOVERING FROM OIL ITS TARRY OR ASPHALTIC CONSTITUENTS WITH GAS AS A BY-PRODUCT.
APPLICATION FILED JULY 6, 1904.

2 SHEETS—SHEET 1.

WITNESSES:

INVENTOR
L. P. Lowe
BY
ATTORNEY

No. 839,940. PATENTED JAN. 1, 1907.
L. P. LOWE.
APPARATUS FOR RECOVERING FROM OIL ITS TARRY OR ASPHALTIC
CONSTITUENTS WITH GAS AS A BY-PRODUCT.
APPLICATION FILED JULY 6, 1904.

2 SHEETS—SHEET 2

Witnesses
Inventor
L. P. Lowe
By Ira Wright
Attorney

UNITED STATES PATENT OFFICE.

LEON P. LOWE, OF SAN FRANCISCO, CALIFORNIA.

APPARATUS FOR RECOVERING FROM OIL ITS TARRY OR ASPHALTIC CONSTITUENTS, WITH GAS AS A BY-PRODUCT.

No. 839,940.  Specification of Letters Patent.  Patented Jan. 1, 1907.

Application filed July 6, 1904. Serial No. 215,546.

*To all whom it may concern:*

Be it known that I, LEON P. LOWE, a citizen of the United States, residing at San Francisco, in the county of San Francisco and State of California, have invented certain new and useful Improvements in Apparatus for Recovering from Oil its Tarry or Asphaltic Constituents, with Gas as a By-Product, of which the following is a specification.

My invention relates to an improved apparatus for refining oil and recovering gas as a by-product.

In certain cases it may be the more profitable treatment of the oil to recover therefrom the asphaltic or other tarry constituents derivable from the oil in as pure a state as possible and in the best condition for use, the generation of hydrocarbon gas therefrom being merely a by-product.

The present apparatus has the above object.

Figure 1:
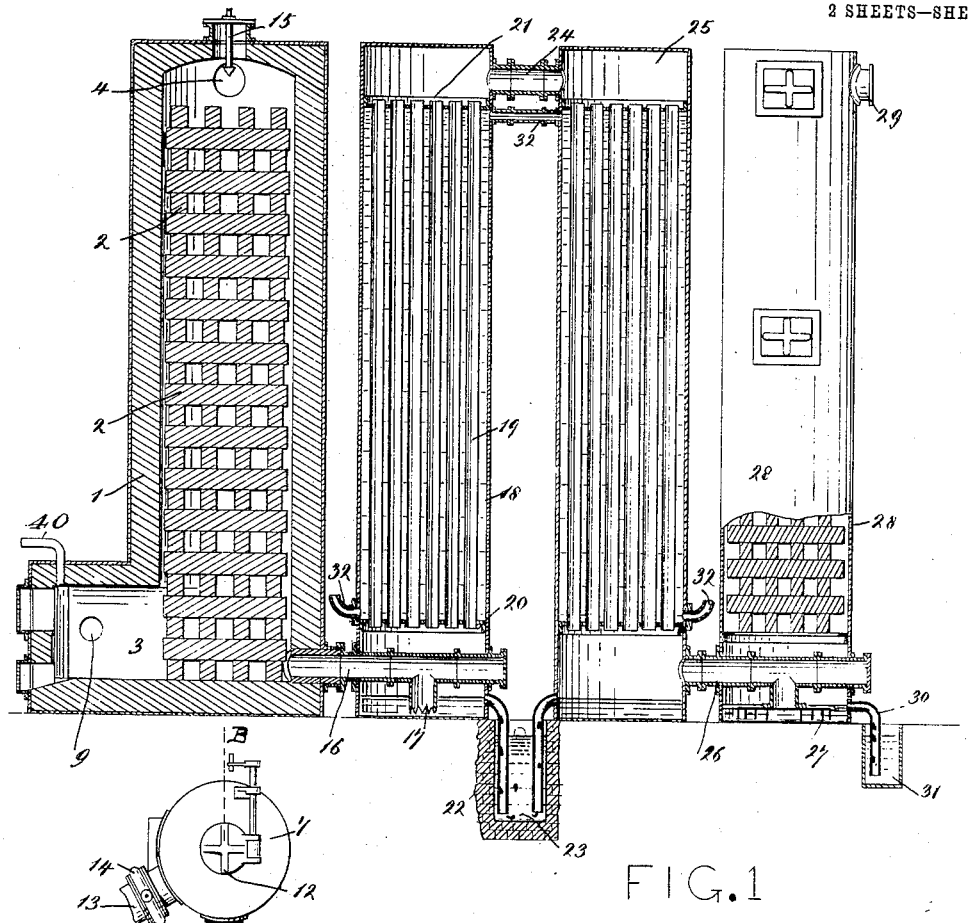
Figure 2:
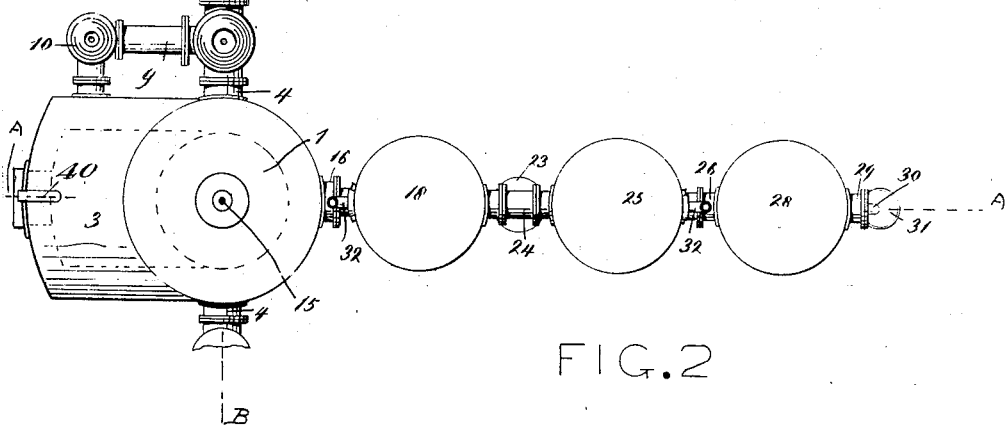
Figure 3:
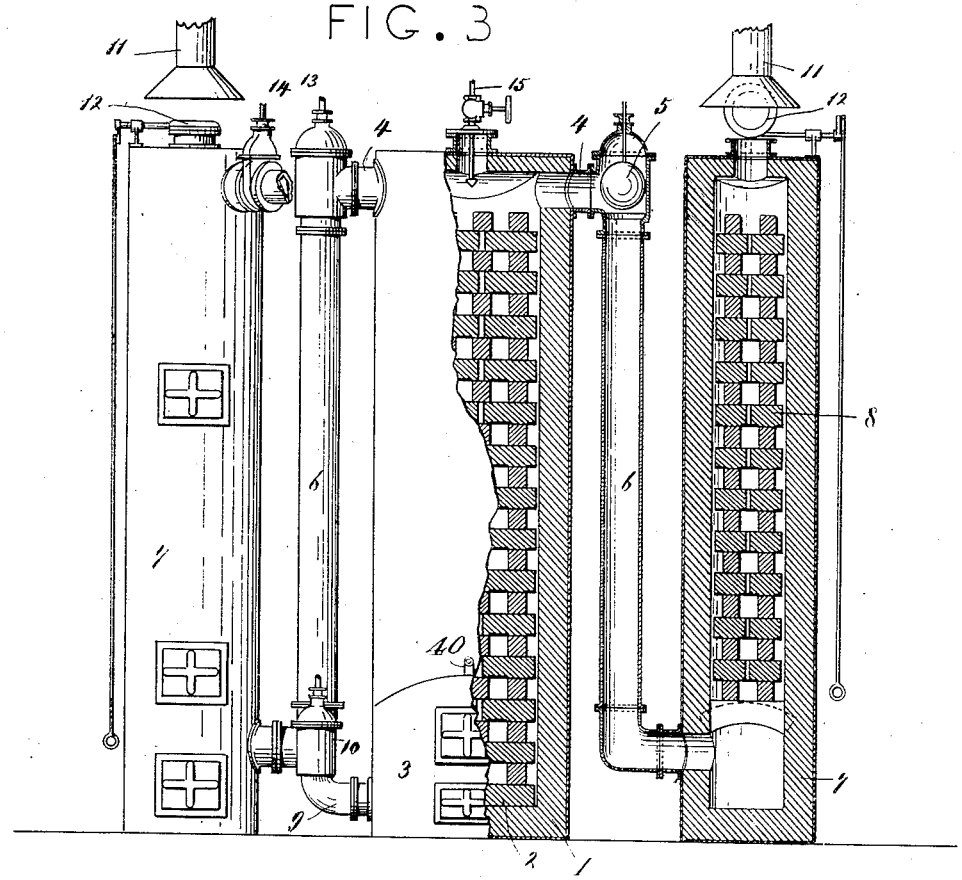
Figure 4:
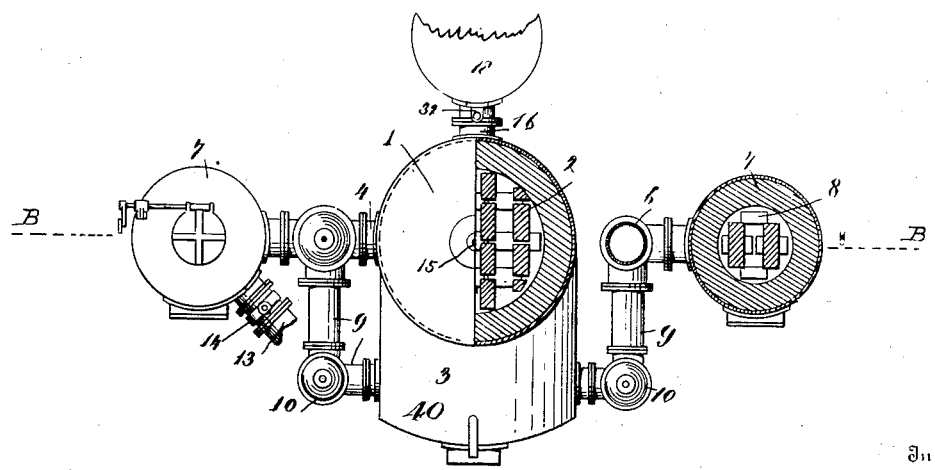

In the accompanying drawings, Figure 1 is a vertical section on the line A A of Fig. 2, the upper part of the scrubber being shown in side elevation. Fig. 2 is a plan view of the apparatus, certain parts being omitted. Fig. 3 is a vertical section on the line B B, one of the stoves being shown in side elevation. Fig. 4 is a plan view of this portion of the apparatus, part being shown in horizontal section.

Referring to the drawings, 1 represents a distilling-chamber, provided with loosely-piled refractory material 2, as fire-brick. It has a combustion-chamber 3, into which fuel may be introduced to intermittently heat the refractory material. The products of combustion pass out at the top through one or the other of two passages 4, each controlled by a valve 5 and leading to a downwardly-extending flue 6, which enters at the bottom of a stove 7, having loosely-piled refractory material 8 therein. These stoves 7 also both communicate by the short horizontal portions 36 of the flues 6 and also by bent passages 9, controlled by valves 10, of any common form used for this purpose, with the combustion-chamber 3 of the distilling-chamber.

11 represents smoke-stacks through which the products of combustion can escape from the stoves, and 12 represents valves for controlling the passages into the smoke-stacks. Inlets 13, controlled by valves 14, are provided for admitting air to the stoves.

15 is an oil-supply pipe for feeding oil to the top of the distilling-chamber 1.

40 represents an oil-supply pipe to the combustion-chamber 3.

16 is a conduit leading to a seal 17, opening into the bottom of a condensing-chamber 18, having vertical flues 19 therein surrounded by a body of water between heads 20 21.

22 is an overflow-pipe from the bottom of the condensing-chamber 18, discharging into a receptacle 23. 24 is a conduit leading from the top of said condensing-chamber to a second condenser 25, precisely similar to the first, and 26 is a conduit leading from said second condenser to a washer 27 at the bottom of a scrubber 28. 29 is an outlet from said scrubber leading to a gas-holder. (Not shown.)

30 is an overflow-pipe from the bottom of the scrubber discharging into a receptacle 31.

32 represents water connections for conducting the water through the condensing-chambers in the opposite direction to the gas.

The object of providing the two stoves is to fully utilize the heat of combustion of the fuel. In this process the refractory material in the distilling-chamber 1 is not heated to so high a degree as to break down any of the gaseous products of the oil into solid hydrocarbons or lampblack, while high enough to convert the light volatile parts of the oil into fixed gases. Therefore much of the heat values would be lost unless provision were made for saving the same. This is done by permitting the products of combustion to pass from the distilling-chamber alternately into the two stoves and utilizing the heat absorbed by the refractory material in the stove.

The operation is therefore as follows: Oil is first burned in the combustion-chamber 3, the air being supplied through a passage 9 from one of the stoves 7. The products of combustion pass up through the distilling-chamber 1, heating the refractory material therein, and escape at the top by the passage 4 and downwardly-extending flue 6 to the opposite stove 7 and then up through said stove and out at the smoke-stack 11. Combustion is continued until the refractory material in the distilling-chamber is sufficiently heated for the purpose desired. The valves 5 and 10 are now closed and oil is admitted by the oil-supply pipe 15 at the top of the distilling-chamber. The heat of the refractory material in the distilling-chamber is arranged to be such that the oil admitted thereto is vaporized only without being broken down into solid hydrocarbonaceous or carbonaceous material. The vapor thus generated consists partly of fixed gases and partly of vapors condensible at ordinary temperatures and pressures, and it passes by the seal 17 into the condensing-chamber 18 and passes up the vertical flues 19, being cooled by the water around said flues. The condensible portion of the vapors is thereby condensed and drops to the bottom of the chamber, escaping by the overflow-pipe 22 into the receptacle 23. The uncondensed vapor, including the fixed gas, flows by the conduit 24 to the second condenser 25, where further condensation takes place and the condensible portions are substantially eliminated, and thence by the conduit 26 to the washer 27 at the bottom of the scrubber 28. The gas flows up through the scrubber, being cleansed thereby, and thence escapes by the outlet 29 to the gas-holder. The water used for scrubbing and the impurities of the gas are drawn off by the pipe 30 to the receptacle 31. When the temperature of the refractory material in the distilling-chamber has fallen too low for the desired purpose, the oil-inlet pipe 15 is closed and said refractory material is again heated up. For this purpose the air which is used to burn the fuel is now passed down through the opposite stove 7—namely, that of which the refractory material was heated by the products of combustion in the previous step. This heated air is admitted by the passage 9, the valve 10, having been opened, supplying a hot blast for supporting combustion in the step of reheating. The products of combustion pass upward through the distilling-chamber, heating the refractory material therein, then out at the opposite side through the passage 4 and downwardly-extending flue 6 to the other stove 7, passing upward therein and heating the refractory material in this stove. When the refractory material in the distilling-chamber has been sufficiently heated, the valves 5 and 10 are closed and the oil-inlet pipe is opened, discharging oil into said distilling-chamber, the step of refining or distilling the oil then being repeated. In each step of heating up the distilling-chamber the directions from which the air is obtained and toward which the products of combustion pass are reversed by suitably operating the valves 5 10 12 14.

The liquid products of the condensing-chambers consist of pure tarry or asphaltic matter, unmixed with water, and therefore constituting a valuable commercial product. The residues collected at the bottom of the scrubber, on the other hand, having been mixed with water are not so valuable.

I claim—

1. In an apparatus of the character described, the combination of a distilling-chamber, loosely-piled refractory material therein, means for passing products of combustion in one direction through said loosely-piled refractory material, a closure for said passage, means for passing oil in the opposite direction through said loosely-piled refractory material, means for condensing the condensible portion of the gases so distilled in said distilling-chamber, means for collecting said condensible portion, and means for separately collecting the uncondensible gases, substantially as described.

2. In an apparatus of the character described, the combination of a distilling-chamber having loosely-piled refractory material therein, means for passing products of combustion through said loosely-piled refractory material to heat the same, means for storing the residual heat of combustion, a closure for said passage, means for passing oil through said loosely-piled refractory material to distill the same, means for condensing the condensible portion of the vapor and collecting the liquids so condensed, means for separately collecting the uncondensed gases, and means for utilizing the stored heat to reheat the refractory material, substantially as described.

3. In an apparatus of the character described, the combination of a distilling-chamber having loosely-piled refractory material therein, means for passing products of combustion in one direction through said loosely-piled refractory material to heat the same, means for storing the residual heat of combustion, a closure for said passage, means for passing oil through said loosely-piled refractory material in the opposite direction to distill the same, means for condensing the condensible portion of the vapor and collecting the liquids so condensed, means for separately collecting the uncondensed gases, and means for utilizing the stored heat to reheat the refractory material, substantially as described.

In witness whereof I have hereunto set my hand in the presence of two subscribing witnesses.

L. P. LOWE.

Witnesses:
FRANCIS M. WRIGHT,
BESSIE GORFINKEL.